US012229187B2

(12) United States Patent
Mashrabov et al.

(10) Patent No.: US 12,229,187 B2
(45) Date of Patent: Feb. 18, 2025

(54) SEARCHING AND RANKING PERSONALIZED VIDEOS

(71) Applicant: Snap Inc., Santa Monica, CA (US)

(72) Inventors: Alexander Mashrabov, Los Angeles, CA (US); Evgenii Krokhalev, London (GB); Sofia Savinova, Sochi (RU); Ivan Babanin, Saratov (RU)

(73) Assignee: Snap Inc., Santa Monica, CA (US)

( * ) Notice: Subject to any disclaimer, the term of this patent is extended or adjusted under 35 U.S.C. 154(b) by 0 days.

(21) Appl. No.: 18/128,249

(22) Filed: Mar. 30, 2023

(65) Prior Publication Data

US 2023/0259556 A1 Aug. 17, 2023

Related U.S. Application Data

(63) Continuation of application No. 17/479,311, filed on Sep. 20, 2021, now Pat. No. 11,645,331, which is a continuation of application No. 16/668,893, filed on Oct. 30, 2019, now Pat. No. 11,157,557, which is a continuation-in-part of application No. 16/594,771, filed on Oct. 7, 2019, now Pat. No. 11,394,888, which is a continuation-in-part of application No. 16/251,436, filed on Jan. 18, 2019, now Pat. No. 10,789,453, said application No. 16/668,893 is a
(Continued)

(51) Int. Cl.
*G06F 16/78* (2019.01)
*G06F 16/738* (2019.01)
*G06F 40/247* (2020.01)
*H04L 51/10* (2022.01)

(52) U.S. Cl.
CPC ........ *G06F 16/7867* (2019.01); *G06F 16/738* (2019.01); *G06F 40/247* (2020.01); *H04L 51/10* (2013.01)

(58) Field of Classification Search
CPC .. G06F 16/738; G06F 16/7867; G06F 40/247; G06F 16/73; H04L 51/10
See application file for complete search history.

(56) References Cited

U.S. PATENT DOCUMENTS

| 9,615,136 B1* | 4/2017 | Emery .................. G06F 16/743 |
| 2014/0074813 A1* | 3/2014 | Franks .................. G06F 16/951 |
| | | 707/706 |

(Continued)

*Primary Examiner* — Ruiping Li
(74) *Attorney, Agent, or Firm* — Georgiy L. Khayet

(57) ABSTRACT

Systems and methods for searching and ranking personalized videos are provided. An example method includes receiving a user request via a communication chat between a user of a computing device and a further user of a further computing device, searching, based on the user request, a pool of personalized videos to determine a first subset of personalized videos, determining first rankings of personalized videos in the first subset of personalized videos, the first rankings being based on global statistical data associated with the personalized videos, selecting, based on the first rankings, a second subset of personalized videos from the first subset of personalized videos, determining, based on at least one characteristic associated with the user, second rankings of personalized videos from the second subset of personalized videos, and presenting the personalized videos selected from the second subset within the communication chat and in order according to the second rankings.

20 Claims, 12 Drawing Sheets

Related U.S. Application Data continuation-in-part of application No. 16/594,690, filed on Oct. 7, 2019, now Pat. No. 11,089,238, which is a continuation-in-part of application No. 16/251,436, filed on Jan. 18, 2019, now Pat. No. 10,789,453, said application No. 16/668,893 is a continuation-in-part of application No. 16/251,472, filed on Jan. 18, 2019, now Pat. No. 11,049,310, and a continuation-in-part of application No. 16/551,756, filed on Aug. 27, 2019, now Pat. No. 10,776,981, which is a continuation-in-part of application No. 16/434,185, filed on Jun. 7, 2019, now Pat. No. 10,839,586, said application No. 16/668,893 is a continuation-in-part of application No. 16/661,086, filed on Oct. 23, 2019, now Pat. No. 11,288,880, which is a continuation-in-part of application No. 16/661,122, filed on Oct. 23, 2019, now Pat. No. 11,308,677.

(56) References Cited

U.S. PATENT DOCUMENTS

| | | | |
|---|---|---|---|
| 2015/0095329 A1* | 4/2015 | Sanio | G06F 16/48 707/732 |
| 2020/0154170 A1* | 5/2020 | Wu | H04N 21/4666 |

* cited by examiner

SEARCHING AND RANKING PERSONALIZED VIDEOS

CROSS-REFERENCE TO RELATED APPLICATION

This application is a Continuation of and claims the priority benefit of U.S. patent application Ser. No. 17/479, 311, entitled "Searching and Ranking Personalized Videos", filed on Sep. 20, 2021, which in turn is a Continuation of U.S. patent application Ser. No. 16/668,893, entitled "Systems and Methods for Searching and Ranking Personalized Videos", filed on Oct. 30, 2019, which in turn is a Continuation-in-part of U.S. application Ser. No. 16/594,771, entitled "Systems and Methods for Providing Personalized Videos," filed on Oct. 7, 2019, which is a Continuation-in-part of U.S. patent application Ser. No. 16/251,436, entitled "Systems and Methods for Face Reenactment," filed on Jan. 18, 2019, U.S. application Ser. No. 16/594,690, entitled "Systems and Methods for Providing Personalized Videos Featuring Multiple Persons," filed on Oct. 7, 2019, which is a Continuation-in-part of U.S. patent application Ser. No. 16/251,436, entitled "Systems and Methods for Face Reenactment," filed on Jan. 18, 2019, a Continuation-in-Part of U.S. patent application Ser. No. 16/251,472, entitled "Systems and Methods for Photorealistic Real-Time Portrait Animation," filed on Jan. 18, 2019, a Continuation-in-Part of U.S. patent application Ser. No. 16/551,756, entitled "Entertaining Mobile Application for Animating a Single Image of a Human Body and Applying Effects," filed on Aug. 27, 2019, which is a Continuation-in-part of U.S. patent application Ser. No. 16/434,185, entitled "Single Image-Based Real-Time Body Animation," filed on Jun. 7, 2019, a Continuation-in-Part of U.S. patent application Ser. No. 16/661, 086, titled "Systems and Methods for Template-Based Generation of Personalized Videos," filed on Oct. 23, 2019, and a Continuation-in-Part of U.S. application Ser. No. 16/661, 122, titled "System and Methods for Generating Personalized Videos with Customized Text Messages," filed on Oct. 23, 2019. The aforementioned applications are incorporated herein by reference in their entirety for all purposes.

TECHNICAL FIELD

This disclosure generally relates to digital image processing. More particularly, this disclosure relates to methods and systems for searching and ranking personalized videos.

BACKGROUND

Sharing media, such as stickers and emojis, has become a standard option in messaging applications (also referred to herein as messengers). Currently, some of the messengers provide users with an option for generating and sending images and short videos to other users via a communication chat. Certain existing messengers allow users to modify the short videos prior to transmission. However, the modifications of the short videos provided by the existing messengers are limited to visualization effects, filters, and texts. The users of the current messengers cannot perform complex editing, such as, for example, replacing one face with another face. Such editing of the videos is not provided by current messengers and requires sophisticated third-party video editing software.

BRIEF DESCRIPTION OF THE DRAWINGS

Embodiments are illustrated by way of example and not limitation in the figures of the accompanying drawings, in which like references indicate similar elements.

DETAILED DESCRIPTION

Figure 1:
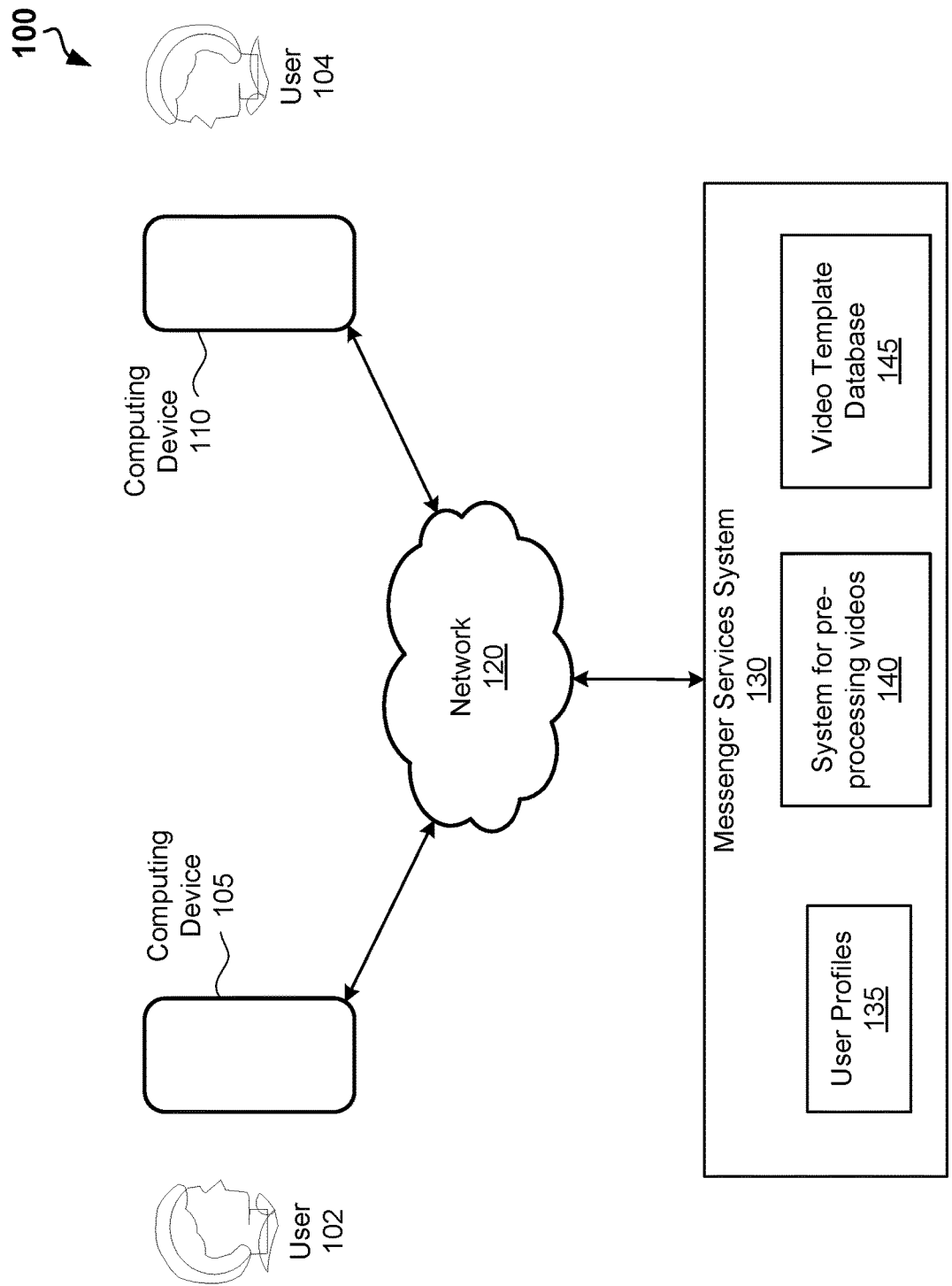
FIG. 1 is a block diagram showing an example environment wherein systems and methods for searching and ranking personalized videos can be implemented.

The following detailed description of embodiments includes references to the accompanying drawings, which form a part of the detailed description. Approaches described in this section are not prior art to the claims and are not admitted prior art by inclusion in this section. The drawings show illustrations in accordance with example embodiments. These example embodiments, which are also referred to herein as "examples," are described in enough detail to enable those skilled in the art to practice the present subject matter. The embodiments can be combined, other embodiments can be utilized, or structural, logical and operational changes can be made without departing from the scope of what is claimed. The following detailed description is, therefore, not to be taken in a limiting sense, and the scope is defined by the appended claims and their equivalents.

For purposes of this patent document, the terms "or" and "and" shall mean "and/or" unless stated otherwise or clearly intended otherwise by the context of their use. The term "a" shall mean "one or more" unless stated otherwise or where the use of "one or more" is clearly inappropriate. The terms "comprise," "comprising," "include," and "including" are interchangeable and not intended to be limiting. For example, the term "including" shall be interpreted to mean "including, but not limited to."

This disclosure relates to methods and systems for searching and ranking personalized videos. The embodiments provided in this disclosure solve at least some issues of known art. The present disclosure can be designed to be implemented on mobile devices, such as smartphones, tablet computers, or mobile phones, in real-time, although the embodiments can be extended to web services or cloud-based resources. Methods described herein can be implemented by software running on a computer system or by hardware utilizing either a combination of microprocessors or other specifically designed application-specific integrated circuits (ASICs), programmable logic devices, or any combinations thereof. In particular, the methods described herein can be implemented by a series of computer-executable instructions residing on a non-transitory storage medium such as a disk drive or computer-readable medium.

Some embodiments of the disclosure may allow generating personalized videos in a real time on a user computing device, such as a smartphone. The personalized videos can be generated based on pre-generated video templates. A video template may include a sequence of frame images and preset text parameters for an animation of a text. The video template may also include a sequence of face area parameters defining positions of a face area in the frame images and a sequence of facial landmark parameters defining positions of facial landmarks in the frame images. Each of the facial landmark parameters may correspond to a facial expression. The frame images can be generated based on an animation video or a live action video.

The facial landmark parameters can be generated based on another live action video featuring a face of an actor (also called a face synchronization (facesync) as described in more detail below), animation video, an audio file, text, or manually. The video template may include a sequence of animated object images. The video template may also include a soundtrack. As used herein, a facesync actor is a person whose facial landmark parameters are used, an actor is another person whose body is used in a video template and whose skin may be recolored, and a user is a person who takes an image of his face to generate a personalized video. Thus, in some embodiments, the personalized video includes the face of the user modified to have facial expressions of the facesync actor and can include a body of the actor taken from the video template and recolored to match the color of the face of the user.

The pre-generated video templates can be stored remotely on a cloud-based computing resource and downloadable by a user of a computing device (such as a smartphone). The user of the computing device can capture, by the computing device, an image of a face or select an image of the face from a camera roll. The computing device may further generate, based on the image of the face and one of the pre-generated video templates, a personalized video. The personalized video may feature the face adopting facial expression corresponding to facial landmark parameters associated with a facesync actor in the pre-generated video template.

The computing device may further add text to the generated personalized video. The computing device may generate a configuration file based on the preset text parameters. The computing device may receive, from a user, an input text to be added to the personalized video. The computing device may render the input text on each frame according to the text parameters in the configuration file. As a result, the input text may appear to be animated in the personalized video. The user may send the personalized video with a preset text or the personalized video with the customized text, via a communication chat, to another user of another computing device.

In some embodiments, the generation of the personalized videos and personalized videos with customized text messages can be integrated in a messenger. A user may search for a personalized video using a keyword, phrase, or emoji. The messenger may include a system for searching and ranking personalized videos. The system for searching and ranking personalized videos may allow searching a pool of personalized videos to determine most relevant personalized videos. The pool may include both the personalized videos with preset text and personalized videos with customized text. The search for relevant personalized videos can be based on the keyword or phrase, context of chat communication of the user with another user of another computing device, user preferences, popularity metrics of the personalized videos, and so forth.

According to one embodiment of the disclosure, an example method for searching and ranking personalized videos may include receiving a user request via a communication chat between a user of a computing device and a further user of a further computing device. The user request may include a phrase. The method may continue with performing, based on the user request, a search of a pool of personalized videos to determine a subset of relevant personalized videos. The personalized videos may be associated with text messages. The method may further include determining first rankings of the relevant personalized videos and selecting, based on the first rankings, a pre-determined number of personalized videos from the subset of relevant personalized videos. The method may then proceed with determining second rankings of the selected personalized videos and presenting the selected personalized videos within the communication chat in an order based on the second rankings.

According to one embodiment of the disclosure, a method for searching and ranking personalized videos is disclosed. The method may include receiving, by a computing device, a user request via a communication chat between a user of the computing device and a further user of a further computing device. The user request may include a phrase. The method may proceed with performing, by the computing device and based on the user request, a search of a pool of personalized videos to determine a subset of relevant personalized videos. The personalized videos may be associated with text messages. The search may be performed by determining that at least one word in the phrase is a synonym to at least one word in a text message associated with at least one of the personalized videos of the pool and adding the at least one of the personalized videos to the subset of relevant personalized videos. In an example embodiment, each of the personalized videos may be associated with one or more activity categories. In this embodiment, the search may include selecting, based on the phrase, a category from the one or more activity categories and determining that at least one personalized video of the pool is associated with the category. The at least one personalized video may be added to the subset of relevant personalized videos.

In a further example embodiment, the search may include calculating a similarity distance between the phrase and a text message associated with a personalized video from the pool, determining whether the similarity distance does not exceed a pre-determined threshold, and adding the personalized video to the subset of relevant personalized videos based on the determination that the similarity distance does not exceed the pre-determined threshold. In a further example embodiment, the search of the pool may include selecting the personalized videos from the pool based on an age of the user.

The method may further include determining, by the computing device, first rankings of the relevant personalized videos. The determination of the first rankings may include computing one or more features. The features may include a probabilistic term weighting a function of the phrase and a text message associated with at least one of the relevant personalized videos, a Jaccard similarity index between terms of the phrase and terms of the text message, and a share rate of the relevant personalized video.

The method may then continue with selecting, by the computing device and based on the first rankings, a predetermined number of personalized videos from the subset of relevant personalized videos. The method may further include determining, by the computing device, second rankings of the selected personalized videos. The determination of the second rankings may include determining a first feature vector and a second feature vector. The first feature vector may include a first global vector corresponding to a text message associated with a personalized video, a popularity metrics of the personalized video, an activity category associated with the personalized video, and information indicative of the personalized video being previously used by the user. The first global vector may be determined based on a model for a distributed word representation. The second feature vector may include a second global vector corresponding to the phrase, a favorite activity category of the user, information concerning personal data of the user, information including at least an age of the user and a gender of the user, and a conversational context of the communication chat. The second global vector may be determined based on the model for a distributed word representation. The determination of the second rankings may further include providing the first feature vector and the second feature vector to a neural network. The neural network may be configured to output a ranking score of the personalized video.

The method may then continue with presenting, by the computing device, the selected personalized videos within the communication chat. The selected personalized videos may be presented in an order based on the second rankings.

The pool of the personalized videos may include a first subpool of personalized videos with pre-rendered text messages and a second subpool of personalized videos with text messages customized by the user. The selected personalized videos may include at least one personalized video from the second subpool. The personalized videos of the first subpool and the personalized videos of the second subpool can be ranked independently. In an example embodiment, prior to computing the first rankings, personalized videos may be filtered out from the second subpool based on a blacklist.

According to another embodiment, a system for searching and ranking personalized videos is provided. The system may include at least one processor and a memory storing processor-executable codes, wherein the at least one processor can be configured to implement operations of the above-mentioned method for searching and ranking personalized videos upon execution of the processor-executable codes.

According to yet another aspect of the disclosure, there is provided a non-transitory processor-readable medium, which stores processor-readable instructions. When the processor-readable instructions are executed by a processor, they cause the processor to implement the above-mentioned method for searching and ranking personalized videos.

Additional objects, advantages, and novel features of the examples will be set forth in part in the description which follows, and in part will become apparent to those skilled in the art upon examination of the following description and the accompanying drawings or may be learned by production or operation of the examples. The objects and advantages of the concepts may be realized and attained by means of the methodologies, instrumentalities, and combinations particularly pointed out in the appended claims.

Referring now to the drawings, example embodiments are described. The drawings are schematic illustrations of idealized example embodiments. Thus, the example embodiments discussed herein should not be understood as limited to the particular illustrations presented herein, rather these example embodiments can include deviations and differ from the illustrations presented herein as shall be evident to those skilled in the art.

FIG. 1 shows an example environment 100, wherein a method for searching and ranking personalized videos can be practiced. The environment 100 may include a computing device 105, a user 102, a computing device 110, a user 104, a network 120, and messenger services system 130. The computing device 105 and computing device 110 can refer to a mobile device such as a mobile phone, smartphone, or tablet computer. In further embodiments, however, the computing device 110 can refer to a personal computer, laptop computer, netbook, set top box, television device, multimedia device, personal digital assistant, game console, entertainment system, infotainment system, vehicle computer, or any other computing device.

The computing device 105 and the computing device 110 can be communicatively connected to the messenger services system 130 via the network 120. The messenger services system 130 can be implemented as a cloud-based computing resource(s). The messenger services system can include computing resource(s) (hardware and software) available at a remote location and accessible over a network (e.g., the Internet). The cloud-based computing resource(s) can be shared by multiple users and can be dynamically re-allocated based on demand. The cloud-based computing resources can include one or more server farms/clusters including a collection of computer servers which can be co-located with network switches or routers.

The network 120 may include any wired, wireless, or optical networks including, for example, the Internet, intranet, local area network (LAN), Personal Area Network (PAN), Wide Area Network (WAN), Virtual Private Network (VPN), cellular phone networks (e.g., Global System for Mobile (GSM) communications network, and so forth.

In some embodiments of the disclosure, the computing device 105 can be configured to enable a communication chat between the user 102 and the user 104 of the computing device 110. The user 102 and the user 104 may exchange text message and videos during the communication chat. The videos may include personalized videos. The personalized videos can be generated based on pre-generated video templates stored in the computing device 105 or the computing device 110. In some embodiments, the pre-generated video templates can be stored in the messenger services system 130 and downloaded to the computing device 105 or the computing device 110 on demand.

The messenger services system 130 may include a system 140 for pre-processing videos. The system 140 may generate video templates based on animation videos or live action videos. The messenger services system 130 may include a video template database 145 for storing the video templates. The video templates can be downloaded to the computing device 105 or the computing device 110. The video template database may also store statistics of downloads of the templates to determine popularity metrics for the video templates. The popularity metrics can be divided into categories based on age of user, gender of user, geographical region, and so forth.

The messenger services system 130 may be also configured to store user profiles 135. The user profiles 135 may include images of the face of the user 102, images of the face of the user 104, and images of faces of other persons. The images of the faces can be downloaded to the computing device 105 or the computing device 110 on demand and based on permissions. Additionally, the images of the face of the user 102 can be generated using the computing device 105 and stored in a local memory of the computing device 105. The images of the faces can be generated based on other images stored in the computing device 105. The images of the faces can be further used by the computing device 105 to generate personalized videos based on the pre-generated video templates. Similarly, the computing device 110 may be used to generate images of the face of the user 104. The images of the face of the user 104 can be used to generate personalized videos on the computing device 110. In further embodiments, the images of the face of user 102 and images of the face of the user 104 can be mutually used to generate personalized videos on the computing device 105 or the computing device 110.

In some embodiments, a pre-generated video template may include a preset default text message. The pre-generated video templates may further include preset text parameters for an animation of the preset default text message in a personalized video generated based on the pre-generated video template. The computer device can be configured to play back the personalized video featuring the preset text message animated based on the preset text parameters. During the playback of the personalized video, the computing device 105 may provide an option to change the preset default text message and parameters for displaying the text message in the personalized video. The computing device 105 may dynamically change the preset default text message in the personalized video while the personalized video is played back. The user 104 may further send the personalized video with the changed text message to the user 104 of the computing device 110 via a communication chat.

In an example embodiment, the text in the text message can be automatically translated if the user 104 is using a language different from the language of the user 102 in the communication chat. Thus, in the communication chat, the user 104 may see the personalized video with the text message displayed in the language used by the user 104.

In some embodiments, the user 102 may search a personalized video to be sent within the communications chat. The user 102 may type a keyword or a phrase. The computing device 105 may perform a search for relevant personalized videos with customized text and present a list of relevant personalized videos for selection by the user 102. The search can be based on the keyword or the phrase, a context of the communication in the communication chat, user's age, user's gender, user's geographical region, popularity metrics of the personalized videos, and so forth.

Figure 2:
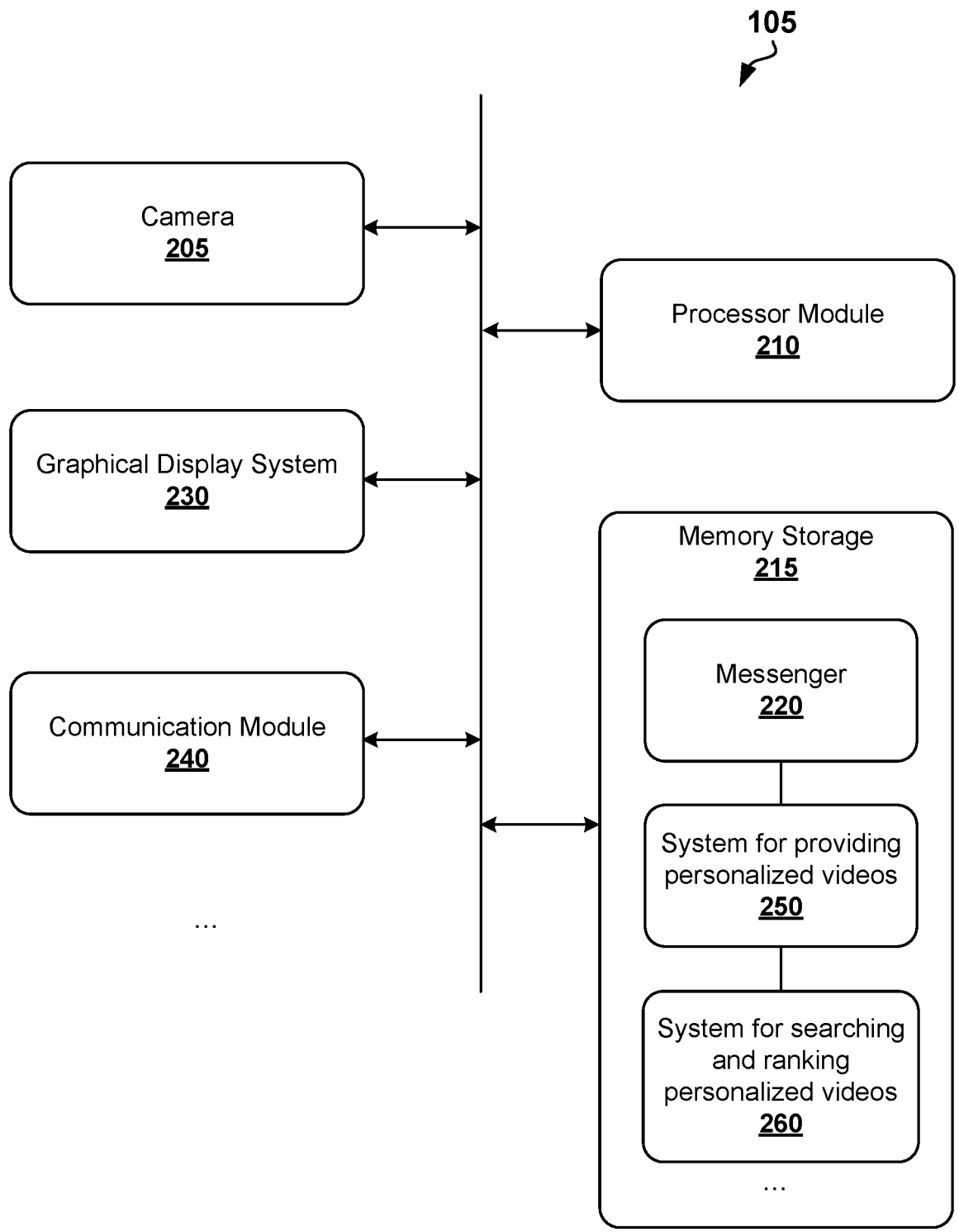
FIG. 2 is a block diagram showing an example embodiment of a computing device for implementing methods for searching and ranking personalized videos.

FIG. 2 is a block diagram showing an example embodiment of a computing device 105 (or computing device 110) for implementing methods for searching and ranking personalized videos. In the example shown in FIG. 2, the computing device 110 includes both hardware components and software components. Particularly, the computing device 110 includes a camera 205 or any other image-capturing device or scanner to acquire digital images. The computing device 110 can further include a processor module 210 and a memory storage 215 for storing software components and processor-readable (machine-readable) instructions or codes, which, when performed by the processor module 210, cause the computing device 105 to perform at least some steps of methods for searching and ranking personalized videos as described herein. The computing device 105 may include graphical display system 230 and a communication module 240. In other embodiments, the computing device 105 may include additional or different components. Moreover, the computing device 105 can include fewer components that perform functions similar or equivalent to those depicted in FIG. 2.

The computing device 110 can further include a messenger 220 for enabling communication chats with another computing device (such as the computing device 110), a system 250 for generating personalized videos, and a system 260 for searching and ranking personalized videos. The system 250 is described in more detail below with reference to FIG. 3. The system 260 is described in more detail below with reference to FIG. 4. The messenger 220, the system 250, and the system 260 may be implemented as software components and processor-readable (machine-readable) instructions or codes stored in the memory storage 215, which when performed by the processor module 210, cause the computing device 105 to perform at least some steps of methods for providing communication chats, generation of personalized videos, and searching and ranking personalized videos as described herein.

In some embodiments, the system 250 for generating personalized videos and the system 260 for searching and ranking personalized videos can be integrated in the messenger 220. A user interface of the messenger 220, the system 250 for generating personalized videos, and system 260 for searching and ranking personalized videos can be provided via the graphical display system 230. The communication chats can be enabled via the communication module 240 and the network 120. The communication module 240 may include a GSM module, a WiFi module, a Bluetooth™ module and so forth.

Figure 3:
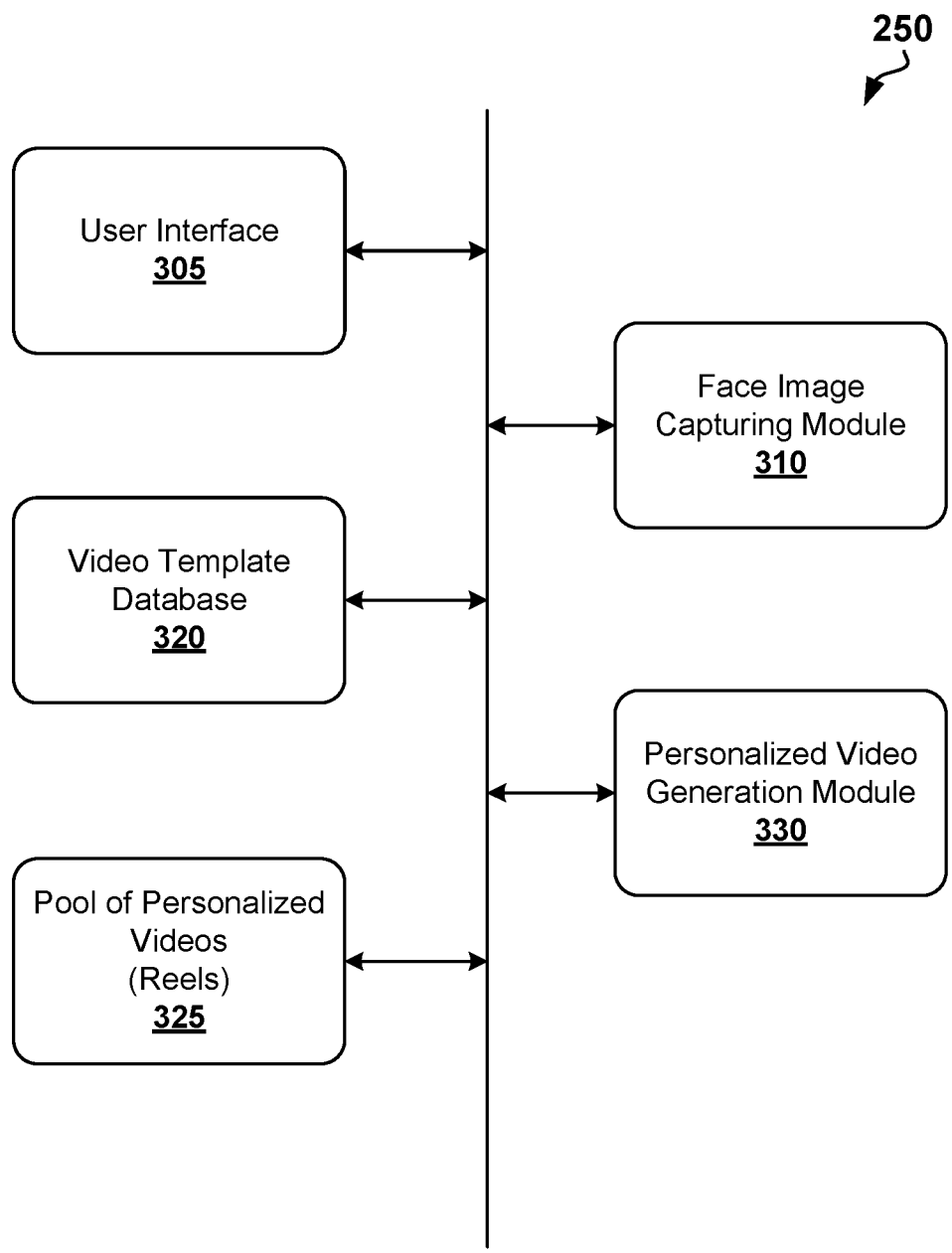
FIG. 3 is a block diagram showing a system for providing personalized videos, according to some example embodiments of the disclosure.

FIG. 3 is a block diagram of a system 250 for generating personalized videos, according to some example embodiment of the disclosure. The system 250 may include a user interface 305, a face image capturing module 310, a video template database 320, a personalized video generation module 330, and a pool 325 of personalized videos (reels).

The video template database 320 may store video templates for generation of personalized videos. The video template database 320 may include video templates downloaded from the video template database 145 of messenger services system 130 (shown in FIG. 1). The video template can include previously recorded videos featuring an actor or multiple actors. The videos may include 2D videos or 3D scenes. The video templates can be pre-processed to segment the actor's face (also referred to as a target face) and background in each frame and to identify a set of parameters that can be used for further insertion of a source face instead of the face of the actor (the target face). The set of parameters can include a face texture, facial expression parameters, face color, facial identity parameters, position and angle of the face, and so forth. The set of parameters may also include a list of manipulations and operations that can be carried out on the actor's face such as the replacement of the actor's face performed in a photorealistic manner.

The face image capturing module 310 can receive an image of a person and generate an image of the face of the person. The image of the face of the person can be used as a source face to replace a target face in the videos stored in the video template database 320. The image of the person can be captured by the camera 205 of the computing device 105. The image of the person can include an image stored in the memory storage 215 of the computing device 105.

The personalized video generation module 330 can generate, based on an image of the source face, a personalized video from one or more pre-generated video templates stored in video template database 320. The personalized video generation module 330 may replace the face of the actor in a pre-generated video with the source face while keeping the facial expression of the face of the actor. The personalized video generation module 330 may replace a face texture, face color, and facial identity of the actor with a face texture, face color, and facial identity of the source face. The personalized video generation module 330 may also add an image of glasses over an eye region of the source face in the personalized video. Similarly, the personalized video generation module 330 may add an image of a headwear (for example, a cap, a hat, a helmet, and so forth) over the head of the source face in the personalized video. The image(s) of the glasses and headwear can be pre-stored in the computing device 105 of the user or generated. The images of the glasses and headwear can be generated using a DNN. The personalized video generation module 330 may also apply a shade or a color to the source face of in the personalized video.

The pool 325 of personalized videos may include videos generated based on the video templates from the video template database 320. The pool 325 may include both the personalized videos with preset text and personalized videos with customized text. A personalized video is also referred to herein as a reel.

Figure 4:
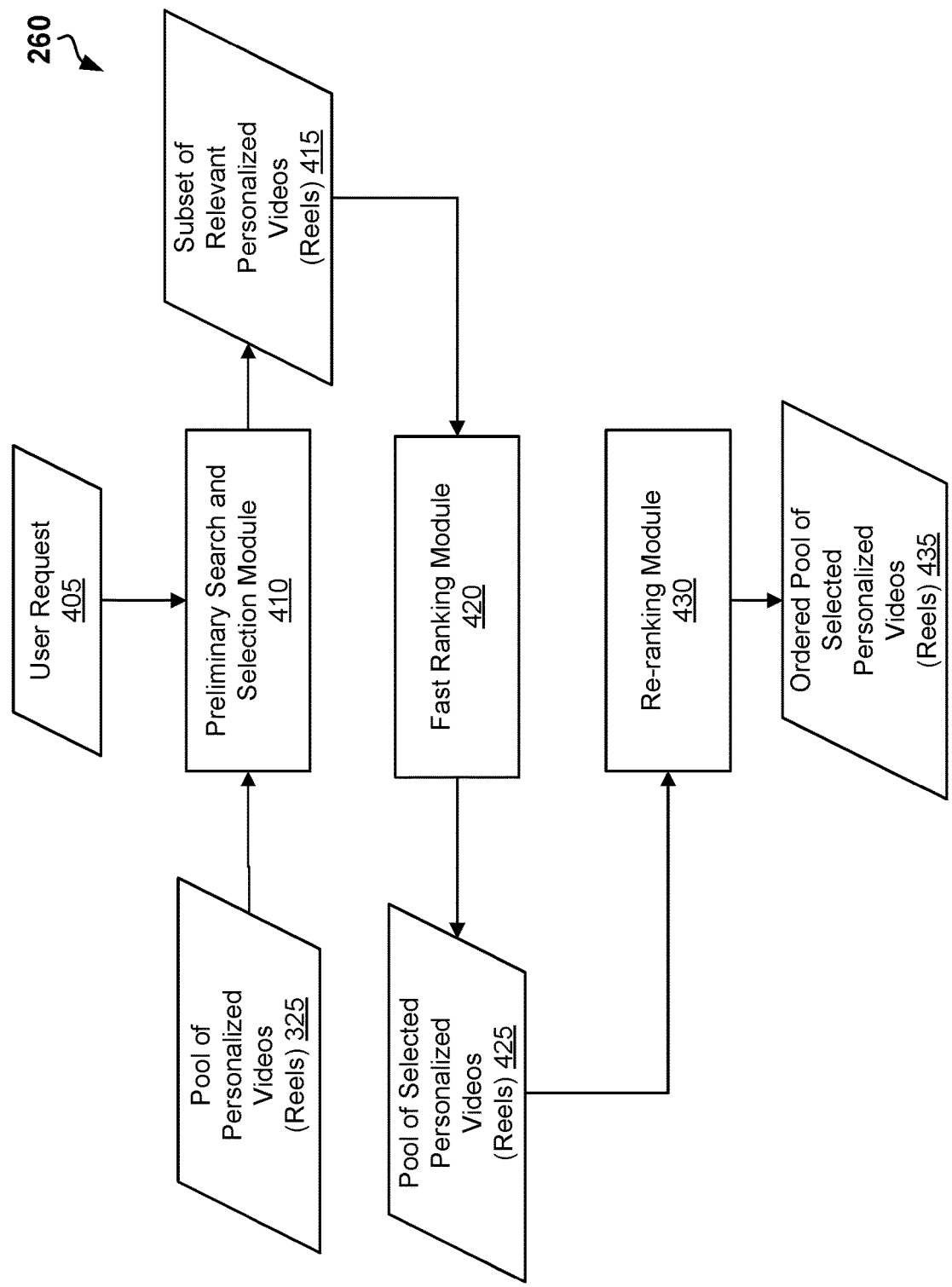
FIG. 4 is a block diagram showing a system for searching and ranking personalized videos, according to some example embodiments of the disclosure.

FIG. 4 is a block diagram showing a system 260 for searching and ranking personalized videos, according to some example embodiment of the disclosure. At block 405, a user request may be received via a communication chat between a user of the computing device and a further user of a further computing device. The user request may include a phrase. A preliminary search and selection module 410 may perform, based on the user request, a search of a pool 325 of personalized videos to determine a subset of relevant personalized videos 415. The personalized videos may be associated with text messages. In an example embodiment, the search can be performed based on templates stored in a video template database 145 (shown in FIG. 1) or a video template database 320 (shown in FIG. 3). The video templates may be personalized and presented to the user. Thus, the preliminary search and selection module 410 may provide an unordered pool of relevant personalized videos.

After performing the preliminary search, a fast ranking module 420 may determine first rankings of the relevant personalized videos. Upon determining the first rankings, a pre-determined number of personalized videos may be selected based on the first rankings from the subset of relevant personalized videos (reels) 415. The selected pre-determined number of personalized videos is shown as a pool of selected personalized videos (reels) 425. A re-ranking module 430 may determine second rankings of the selected pre-determined number of personalized videos. Upon determining the second rankings, an ordered pool of the selected personalized videos (reels) 435 may be presented within the communication chat. The selected personalized videos may be presented in the pool in an order determined based on the second rankings.

Figure 5:
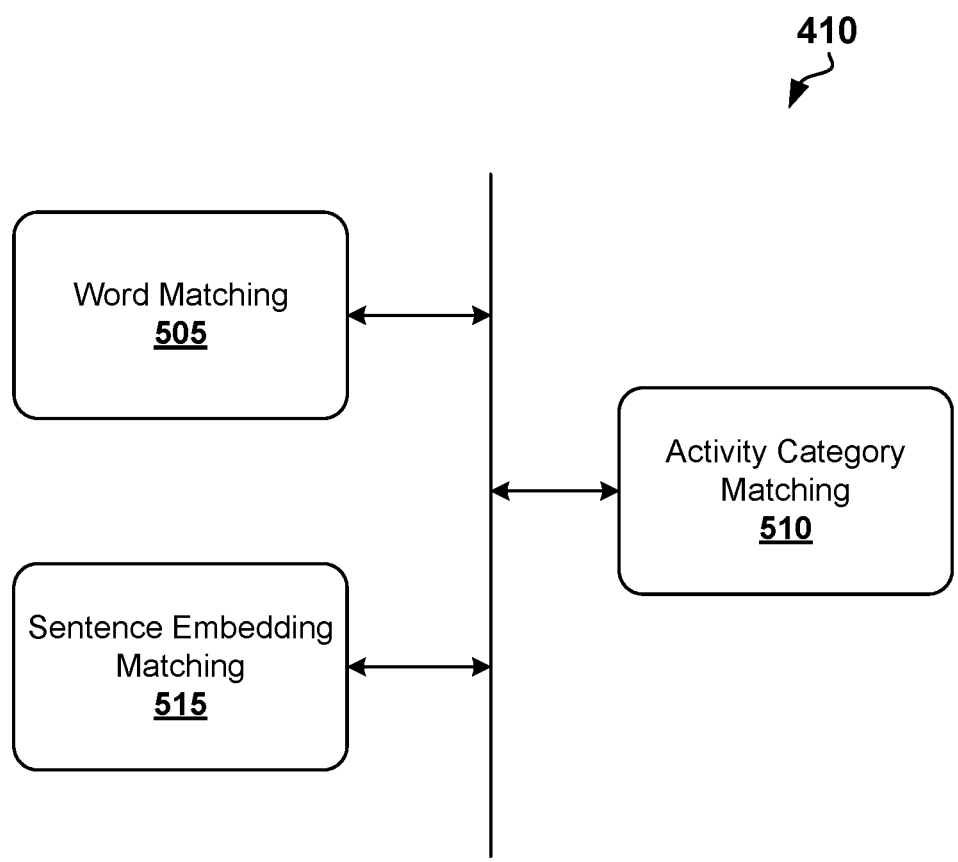
FIG. 5 is a block diagram showing a preliminary search and selection module, according to some example embodiments of the disclosure.

FIG. 5 is a block diagram showing a preliminary search and selection module 410, according to some example embodiment of the disclosure. The preliminary search and selection module 410 may be configured to perform word matching 505. Many words in a language can have different forms (such as "amazing" and "amazed"), but their meanings are similar in regards to a search request. The preliminary search and selection module 410 may have a search engine configured to reduce inflected words to their base or root form. For this purpose, the stemming technique that implies using a lookup table for conversion each word into base form may be used. This approach allows to have the best control over algorithm behavior and easily handle corner cases. For better search performance, the search request (i.e., a user request) may be expanded with synonyms. A table with sets of synonym phrases (all phrases have similar meaning in each set) may be provided. If one of the phrases is present in the search request, the search request can be extended by replacing the phrase with any other phrase from the same set.

For smooth user experience, it may be critically important to find appropriate personalized videos promptly. A data structure called an inverted index may be used. The inverted index data structure may enable to efficiently find personalized videos with a specific word in the description. Also, prefix matching may be applied for the last word in the user request.

All the personalized videos that were found during this step may be added to the ranking pool shown as a subset of relevant personalized videos 415 shown in FIG. 4.

Another important issue is to avoid toxic content in customized personalized videos. For this purpose, fuzzy matching with blacklist words may be used. For each word from the search request, the weighted Levenshtein distance may be computed with every word from a predetermined blacklist. The weighted Levenshtein distance can be computed using dynamic programming algorithm:

$$dp[i][j]=\min(dp[i][j-1]+\text{cost}(b_j), dp[i-1][j]+\text{cost}(a_i), dp[i-1][j-1]+\text{sim}(a_i,b_j))$$

$$\text{if } a[i]==b[j]: dp[i][j]=\min(dp[i][j], dp[i-1][j-1])$$

where $\text{cost}(a_i)$ is a cost of insertion of one character, and $\text{sim}(a_i, b_j)$ is a similarity distance between characters.

So, for example, the weighted Levenshtein distance may be low for words "bigger" and "bigger" because the similarity distance $\text{sim}("1", "i")$ is small. If the distance is less than a specific predefined threshold, the word may be considered as toxic and customized personalized videos having this word may be not shown.

The preliminary search and selection module 410 may be configured to perform activity category matching 510. All personalized videos can be grouped in a number of activity categories. The activity categories may be defined, for example, by user activity, such as Happy, Upset, Angry, Love, Greetings, Celebration, Food, Surprised, Question, Neutral, and so forth. The activity category matching 510 is intended to predict an activity category for the user request based on a classifier of the neural network and add personalized videos from this category to the pool of relevant personalized videos.

The neural network classifier may consist of the following components: the unigram language model and the multilayer recurrent neural network. The unigram language model may be used for data pre-processing. The unigram language model maximizes the following marginal likelihood:

$$\mathcal{L} = \sum_{s=1}^{|D|} \log(P(X^{(s)})) = \sum_{s=1}^{|D|} \log\left(\sum_{x \in S(X^{(s)})} P(x)\right)$$

where L is likelihood, P is probability of a subword sequence, and S is a set of segmentation candidates. Then, data are fed into the multilayer recurrent neural network with instance normalization and leaky ReLU as an activation function. A self-attention mechanism may be used as the last layer of the neural network. To train the neural network, a dataset of 10,000 user requests with assigned categories may be manually created. For better convergence, this model may be trained using the Lookahead optimizer in supervised fashion with categorical cross-entropy loss.

In an example embodiment, to improve customized personalized video ranking, ten categories that describe user activities (Happy, Upset, Angry, Love, Greetings, Celebration, Food, Surprised, Question, Neutral) may be identified. The search engine can refer each search request to one of these activities. To identify activity, a natural language understanding technique can be used. For each activity type, the information on a share rate of customized personalized videos may be collected. The ranking may be improved by prioritizing customized personalized videos with the high share rate for user requests with certain activity.

The preliminary search and selection module 410 may be configured to perform sentence embedding matching 515. In any language, there are many words with similar meanings. The goal of this step is to provide relevant results even if the exact word matching has not been found. The sentence embedding is computed as the mean value of GloVe embeddings for all words from the user request. Also, for each description of the personalized video, the embeddings may be pre-computed in a similar way.

For any user request, the sentence embedding matching 515 may search for personalized videos having the closest embedding. This may be done in a high-dimensional space using the Locality-Sensitive Hashing. All personalized videos with cosine similarity larger than 0.7 may be added to the ranking pool shown as the subset of relevant personalized videos 415 in FIG. 4.

In an example embodiment, the users may use an emoji or a combination of emojis and other symbols/words as a search request for searching for personalized videos. The GloVe model may be trained on text corpus similar to what people use in communication chats, so the model may contain multiple emojis. The trained model may provide a vector representation for each token in this corpus. For each emoji, words with the closest embeddings may be found using an embedding vector and the cosine distance. Thereby, the emoji may be replaced with the word that describes the emoji.

In a further example embodiment, the context of chat conversation can significantly improve the search quality. For example, if users are chatting about football, football-related personalized videos may be raised higher in search results.

The neural network based approach may be used for extracting content information from chat conversation. The algorithm may be based on transformer architecture with multi-head self-attention. A strong pre-trained model allows to extract a meaningful embedding vector from a user's dialog. Based on the embedding, the transfer learning technique may be used to get sufficient results on a downstream task. Before feeding text to the transformer, it may be necessary to provide positional embedding for distinguishing words at different positions. Sine and cosine functions with different frequencies may be used for this purpose. The formulas below describe how to generate positional embedding:

$$\text{PosEmb}(pos, 2i) = \sin(pos/10000^{2i/d})$$

$$\text{PosEmb}(pos, 2i+1) = \cos(pos/10000^{2i/d})$$

where pos is a token number, d is a positional embedding size, and i is a coordinate in embedding.

Figure 6:
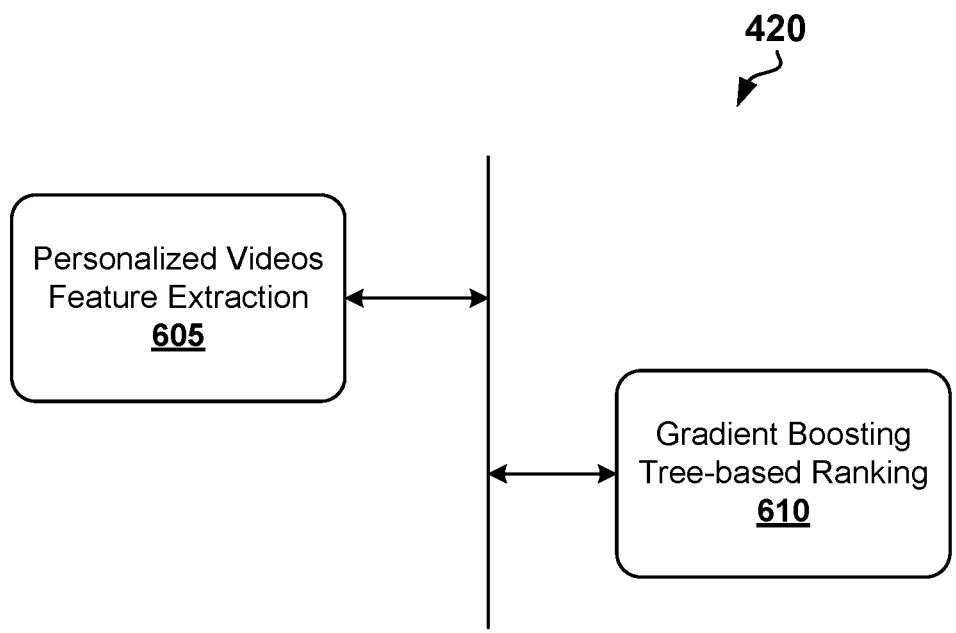
FIG. 6 is a block diagram showing a fast ranking module, according to some example embodiments of the disclosure.

FIG. 6 is a block diagram showing a fast ranking module 420, according to some example embodiments of the disclosure. The fast ranking module 420 may be configured to perform personalized videos feature extraction 605. For fast ranking, the following features may be extracted: probabilistic weighting sums BM11, BM15, BM25, the dot product of GloVe embeddings for a user query and description of the personalized video, a global share rate of the personalized video, a specific share rate of the personalized video activity, the Jaccard Index of common terms of the user query and description of the personalized video, and so forth. The following formula may be used for determining the Jaccard Index:

$$J(A, B) = \frac{|A \cap B|}{|A \cup B|} = \frac{|A \cap B|}{|A| + |B| - |A \cap B|}.$$

The fast ranking module 420 may be configured to perform gradient boosting tree-based ranking 610 (i.e., the gradient boosting trees can be used for ranking). After this step, a predetermined number of top personalized videos are selected for the re-ranking step. The fast ranking allows achieving better quality results with high efficiency.

Figure 7:
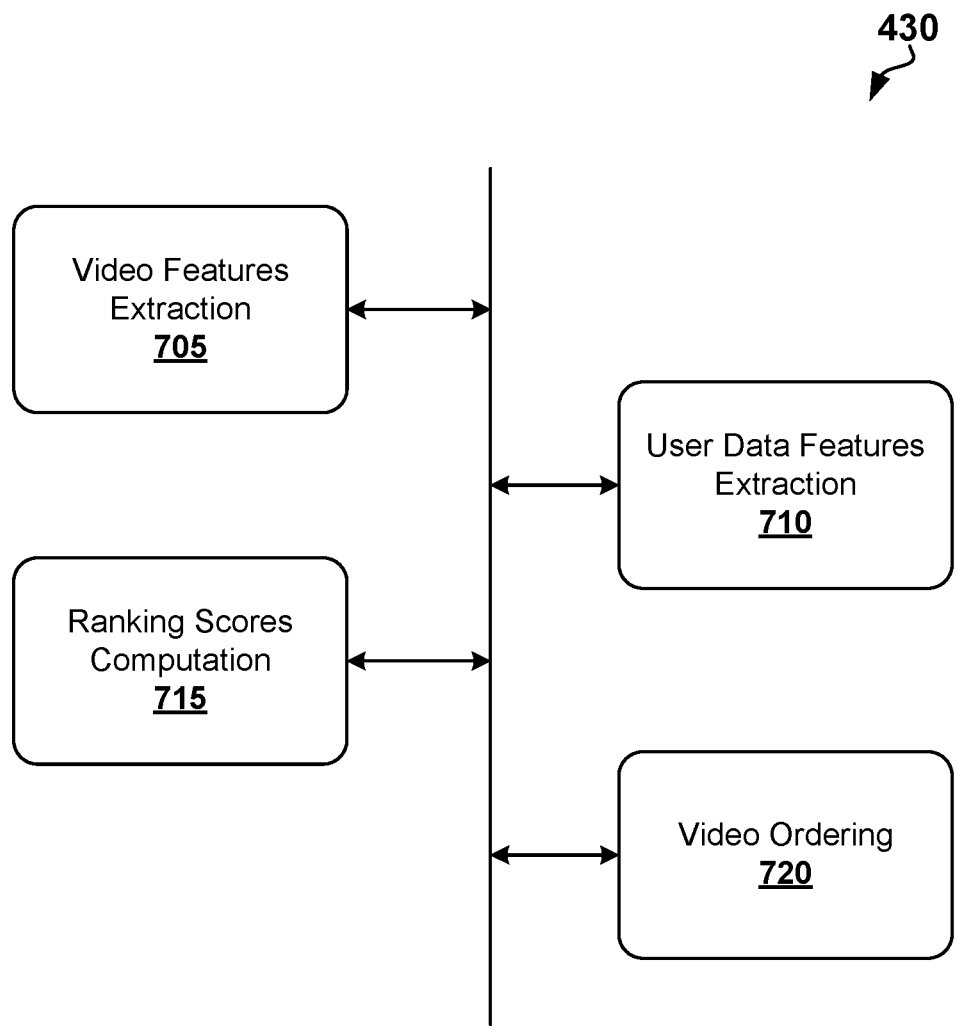
FIG. 7 is a block diagram showing a re-ranking module, according to some example embodiments of the disclosure.

FIG. 7 is a block diagram showing a re-ranking module 430, according to some example embodiments of the disclosure. The re-ranking module 430 may be configured to perform video features extraction 705. Specifically, the following features may be extracted for the selected personalized videos: GloVe embeddings, popularity metrics, activity category, information on whether the user has seen this personalized video before, and so forth. These features may be stacked into the embedding vector EmbC associated with the personalized videos.

The re-ranking module 430 may be configured to perform user data features extraction 710. The following features may be extracted from the user data: query embedding, a favorite category of the user, and basic user information, such as a gender, an age, and so forth. Additionally, conversational context can also be used as a feature. These features may be stacked into the embedding vector EmbU associated with the user.

The re-ranking module 430 may be configured to perform ranking scores computation 715. The EmbC and EmbU may be fed into a fully connected neural network with one perceptron in the last layer that predicts ranking score. Further, the re-ranking module 430 may perform video ordering 720 to order personalized videos based on ranking scores. In particular, the personalized videos with a larger score may appear higher in the search results.

To train the two ranking models, a dataset of at least 10,000 user requests may be used (the same as for activity category prediction). In this case, for each user request, five relevant personalized videos may be assigned. The models may be optimized for each pair of a user request and relevant personalized videos to increase the ranking score. Also, for each user request, five random and five irrelevant personalized videos may be selected. Furthermore, the model may be trained for each pair of a user request and one of these personalized videos to decrease the ranking score.

Figure 8:
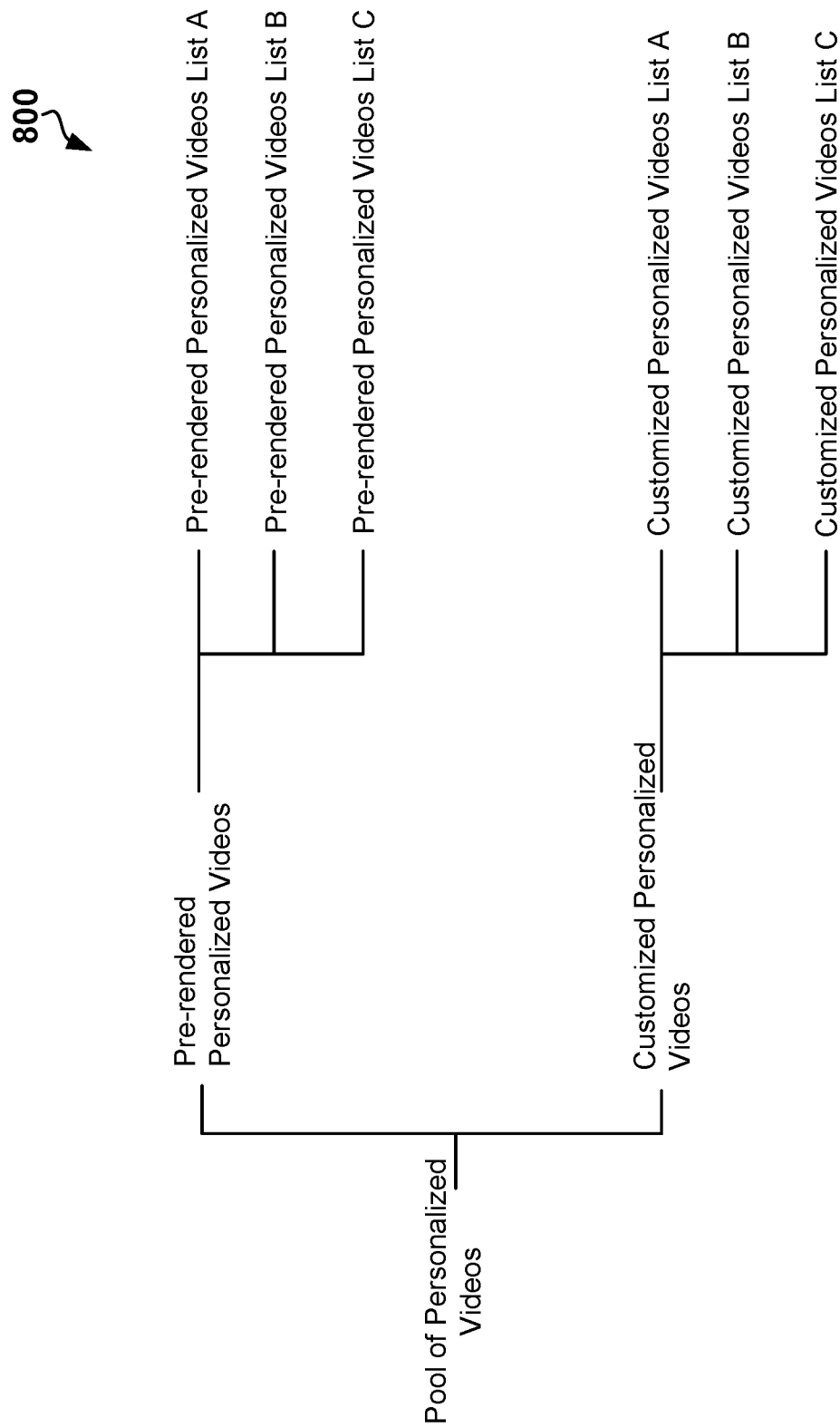
FIG. 8 is a schematic diagram showing classification of personalized videos, according to some example embodiments of the disclosure.

FIG. 8 is a schematic diagram 800 showing classification personalized videos, according to some example embodiments of the disclosure. Two different types of personalized videos need to be ranked: personalized videos with pre-rendered text and customized personalized videos (with text given by a user). To get the final order, personalized videos may be ranked independently inside each type and the results can be merged according to the logic described below.

Personalized videos may be divided into six categories in a categories section and the user can select a category and view the best reels that correspond to the user's intent. The six categories for personalized videos may include: Featured, Greetings, Love, Happy, Upset, and Celebration. In each category, personalized videos may be shown to the user. Users may be differentiated to four age groups: under 18, 18-30, above 30, and N/A, and to three gender groups: Male, Female, and N/A. Overall there may be twelve groups of users. Also, two different types of content may be used, namely personalized videos that were previously present in an application and for which the performance metrics are already calculated and new personalized videos. In particular, if search results are ranked only according to relevance of personalized videos, users may get the same search results in every session. To make user engagement higher, search results may be changed by adding new personalized videos that the user has not seen before. The addition of new personalized videos may not affect the relevance of the search results.

Referring to FIG. 8, List A specifies best personalized videos with determined performance metrics for each age group, gender group, and categories to which this reel belongs. List B specifies new personalized videos for each category with no information on performance metrics and no performance assumptions for different user groups. List B may have friend personalized videos and customized personalized videos. List C specifies personalized videos with determined performance metrics for each age group and gender group. Customized personalized videos allow users to add any text they want to the personalized videos. When a user inputs any text, the text may be placed on these personalized videos, and the personalized videos may appear in a quick search section. The text may have preset animation and style, and voiceovers for the personalized videos may be generic. Some personalized videos may have both customized and pre-rendered versions. Customized personalized videos may have default text, so that the personalized videos may be shown in the categories section. Search metadata information may contain a search description and tags that describe use cases for which the personalized video is relevant. This data may exist for all personalized videos.

In an example embodiment, personalized videos may be selected by an algorithm from the List A and List B for each category. For each group and in each category, the following algorithm may be applied to a predefined number of reels and their order:

Personalized videos on positions 1, 2, 7 ... 24 are selected from List A according to an accumulated share rate for that particular group;

Personalized videos on positions 3, 4, 5, 6 are taken from List B and are the same for all groups. This step may help to introduce new personalized videos and get statistics;

If some personalized videos from List B are friend personalized videos and the feature is disabled in a current communication chat, the personalized videos from List B may be replaced by personalized videos from List A according to their order;

Sometimes List B can have smaller sizes for some categories, but the similar logic may be applied to List B.

Additionally, a Recent category may be personalized for a specific user and may include the recently shared personalized videos. The number of personalized videos in the Recent category may not exceed a predefined number. If the number of recently shared personalized videos is less than 8, the rest of the positions in the category may be filled with personalized videos from the Featured category. If some of these personalized videos are customized, the versions of personalized videos with default text may be used.

In general, the ranking may be used to provide a fast and easy way to get top personalized videos for popular user requests. For this purpose, user metrics for personalized videos may be tracked, and only high-performance personalized videos may be kept. User metrics for new personalized videos may be evaluated. Furthermore, personalized lists for different user groups may be provided based on personalized video statistics. Additionally, the machine learning based prediction of user intent may be utilized.

Figure 9:
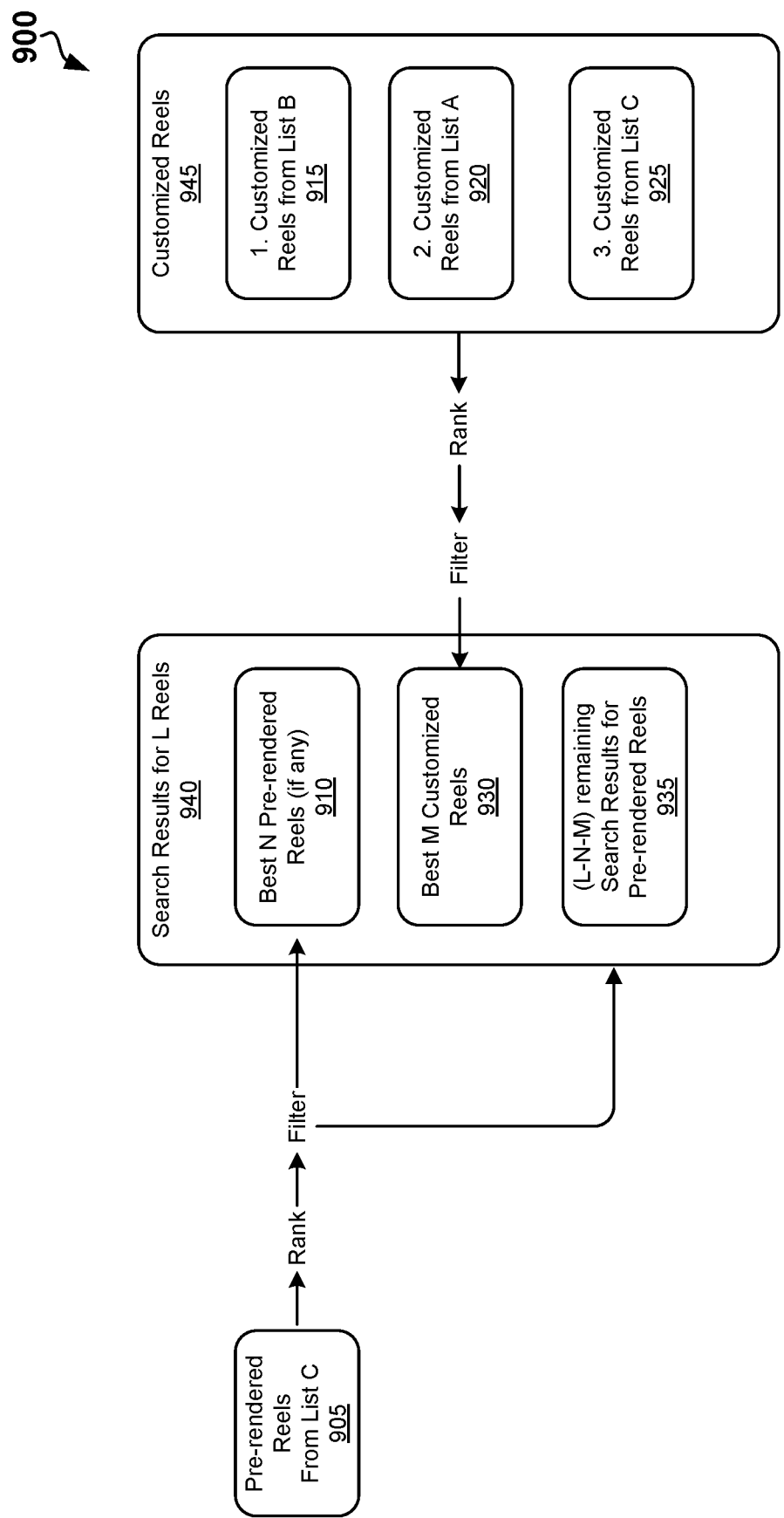
FIG. 9 is a flow chart showing a process for selecting and ranking personalized videos, according to some example embodiments of the disclosure.

FIG. 9 is a flow chart showing a process 900 for selecting and ranking personalized videos, according to some example embodiments of the disclosure. The selecting and ranking of personalized videos to provide search results 940 for L reels may include the following steps. First best N pre-rendered reels 910 may include relevant (if any) pre-rendered personalized videos (reels) from List C. Pre-rendered Reels 905 from List C may be added only if pre-rendered texts on these Reels are relevant to the user request. Next best M Customized Reels 930 may include relevant customized Reels 945 selected from customized Reels 915 from List B, customized Reels 920 from List A, and customized Reels 925 from List C, which are ranked according to their relevance to a search query. The customized Reels that are not allowed due to technical restrictions are filtered out (it is checked whether user text may be fitted in the personalized video). (L-N-M) remaining search results for pre-rendered Reels 935 may include less relevant Reels from pre-rendered Reels 905 from List C.

If a search query contains at least one phrase from a predetermined blacklist for custom personalized videos, no customized personalized videos may be presented for this search query. The blacklist may contain only hate speech/slurs, and more standard profanity may be allowed in some embodiments.

For some search queries, both customized and pre-rendered versions of the same personalized video may be selected for a search report. To avoid showing two similar personalized videos, only one of these personalized videos may be selected in a final search result. If the search query is an exact match (or prefix) with pre-rendered personalized video text, a pre-rendered version of the personalized video may be shown. Otherwise, a customized version of the personalized video may be presented.

Figure 10:
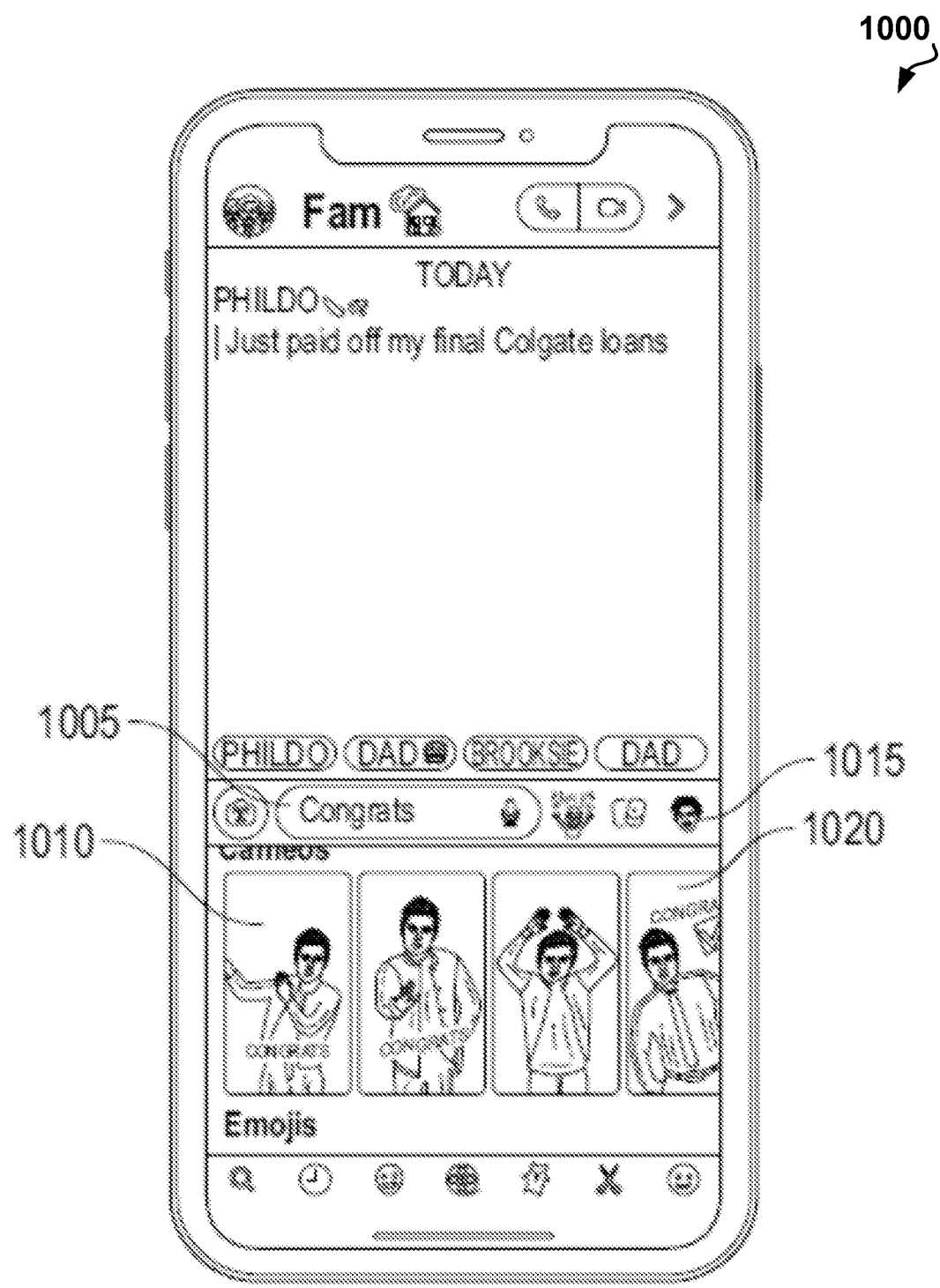
FIG. 10 shows an example screen of a communication chat, according to an example embodiment of the disclosure.

FIG. 10 shows an example screen 1000 of a communication chat, according to an example embodiment of the disclosure. A quick search icon 1015 may be presented to the user to enable the user to select one of the personalized videos 1010. Tapping on the quick search icon 1015 may open a sticker picker on a search tab 1020. A user face on the personalized video 1010 may have emotional reenactment and some visual elements around it according to the activity category determined for the search query 1005.

Figure 11:
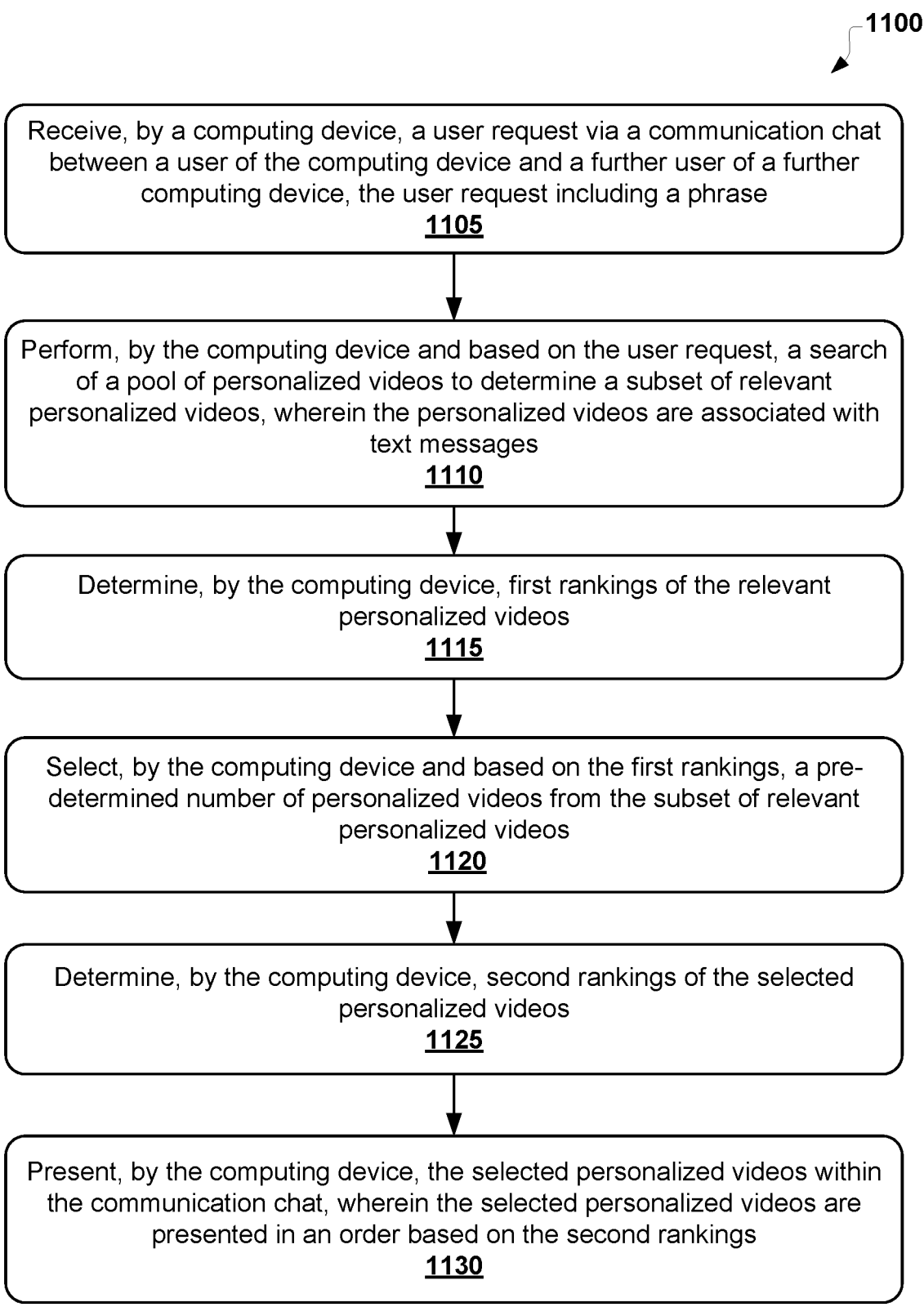
FIG. 11 is a flow chart showing a method for searching and ranking personalized videos, in accordance with an example embodiment.

FIG. 11 is a flow chart showing a method for searching and ranking personalized videos, in accordance with an example embodiment. The method 1100 can be performed by the computing device 105. The method 1100 may commence with receiving a user request via a communication chat between a user and a further user at step 1105. The user request may include a phrase. The method 1100 may continue with performing, based on the user request, a search of a pool of personalized videos at step 1110. The search of the pool of personalized videos may be performed to determine a subset of relevant personalized videos. The personalized videos may be associated with text messages. The method 1100 may further include determining first rankings of the relevant personalized videos at step 1115. The method 1100 may continue with selecting a pre-determined number of personalized videos from the subset of relevant personalized videos at step 1120. The pre-determined number of personalized videos may be selected based on the first rankings. The method 1100 may further include determining second rankings of the selected personalized videos at step 1125. At step 1130, the selected personalized videos may be presented within the communication chat in an order based on the second rankings.

Figure 12:
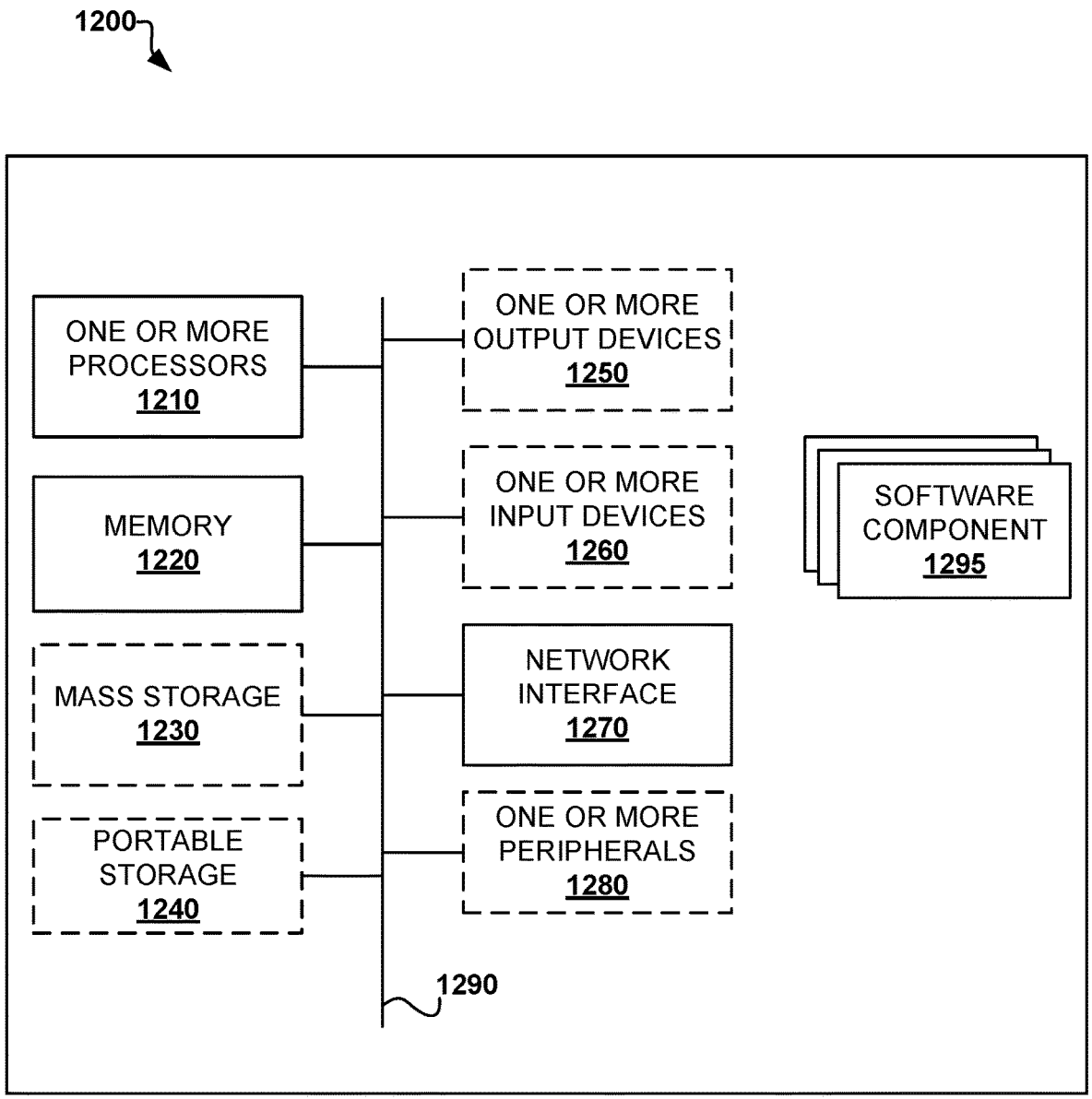
FIG. 12 shows an example computer system that can be used to implement methods for searching and ranking personalized videos.

FIG. 12 illustrates an example computing system 1200 that can be used to implement methods described herein. The computing system 1200 can be implemented in the contexts of the likes of computing devices 105 and 110, the messenger services system 130, the messenger 220, the system 250 for generating of personalized videos, and the system 260 for searching and ranking personalized videos.

As shown in FIG. 12, the hardware components of the computing system 1200 may include one or more processors 1210 and memory 1220. Memory 1220 stores, in part, instructions and data for execution by processor 1210. Memory 1220 can store the executable code when the computing system 1200 is in operation. The computing system 1200 may further include an optional mass storage device 1230, optional portable storage medium drive(s) 1240, one or more optional output devices 1250, one or more optional input devices 1260, an optional network interface 1270, and one or more optional peripherals 1280. The computing system 1200 can also include one or more software components 1295 (e.g., ones that can implement the method for providing personalized videos as described herein).

The components shown in FIG. 12 are depicted as being connected via a single bus 1290. The components may be connected through one or more data transport means or data network. The processor 1210 and memory 1220 may be connected via a local microprocessor bus, and the mass storage device 1230, peripherals 1280, portable storage medium drive(s) 1240, and network interface 1270 may be connected via one or more input/output (I/O) buses.

The mass storage device 1230, which may be implemented with a magnetic disk drive, solid-state disk drive, or an optical disk drive, is a non-volatile storage device for storing data and instructions for use by the processor 1210. Mass storage device 1230 can store the system software (e.g., software components 1295) for implementing embodiments described herein.

Portable storage medium drive(s) 1240 operates in conjunction with a portable non-volatile storage medium, such as a compact disk (CD), or digital video disc (DVD), to input and output data and code to and from the computing system 1200. The system software (e.g., software components 1295) for implementing embodiments described herein may be stored on such a portable medium and input to the computing system 1200 via the portable storage medium drive(s) 1240.

The optional input devices 1260 provide a portion of a user interface. The input devices 1260 may include an alphanumeric keypad, such as a keyboard, for inputting alphanumeric and other information, or a pointing device, such as a mouse, a trackball, a stylus, or cursor direction keys. The input devices 1260 can also include a camera or scanner. Additionally, the computing system 1200 as shown in FIG. 12 includes optional output devices 1250. Suitable output devices include speakers, printers, network interfaces, and monitors.

The network interface 1270 can be utilized to communicate with external devices, external computing devices, servers, and networked systems via one or more communications networks such as one or more wired, wireless, or optical networks including, for example, the Internet, intranet, LAN, WAN, cellular phone networks, Bluetooth radio, and an IEEE 802.11-based radio frequency network, among others. The network interface 1270 may be a network interface card, such as an Ethernet card, optical transceiver, radio frequency transceiver, or any other type of device that can send and receive information. The optional peripherals 1280 may include any type of computer support device to add additional functionality to the computer system.

The components contained in the computing system 1200 are intended to represent a broad category of computer components. Thus, the computing system 1200 can be a server, personal computer, hand-held computing device, telephone, mobile computing device, workstation, minicomputer, mainframe computer, network node, or any other computing device. The computing system 1200 can also include different bus configurations, networked platforms, multi-processor platforms, and so forth. Various operating systems (OS) can be used including UNIX, Linux, Windows, Macintosh OS, Palm OS, iOS, Android, and other suitable operating systems.

Some of the above-described functions may be composed of instructions that are stored on storage media (e.g., computer-readable medium or processor-readable medium). The instructions may be retrieved and executed by the processor. Some examples of storage media are memory devices, tapes, disks, and the like. The instructions are operational when executed by the processor to direct the processor to operate in accord with the invention. Those skilled in the art are familiar with instructions, processor(s), and storage media.

It is noteworthy that any hardware platform suitable for performing the processing described herein is suitable for use with the invention. The terms "computer-readable storage medium" and "computer-readable storage media" as used herein refer to any medium or media that participate in providing instructions to a processor for execution. Such media can take many forms, including, but not limited to, non-volatile media, volatile media, and transmission media. Non-volatile media include, for example, optical or magnetic disks, such as a fixed disk. Volatile media include dynamic memory, such as system random access memory (RAM).

Transmission media include coaxial cables, copper wire, and fiber optics, among others, including the wires that include one embodiment of a bus. Transmission media can also take the form of acoustic or light waves, such as those generated during radio frequency (RF) and infrared (IR) data communications. Common forms of computer-readable media include, for example, a floppy disk, a flexible disk, a hard disk, magnetic tape, any other magnetic medium, a CD-read-only memory (ROM) disk, DVD, any other optical medium, any other physical medium with patterns of marks or holes, a RAM, a PROM, an EPROM, an EEPROM, any other memory chip or cartridge, a carrier wave, or any other medium from which a computer can read.

Various forms of computer-readable media may be involved in carrying one or more sequences of one or more instructions to a processor for execution. A bus carries the data to system RAM, from which a processor retrieves and executes the instructions. The instructions received by the system processor can optionally be stored on a fixed disk either before or after execution by a processor.

Thus, the methods and systems for searching and ranking personalized videos have been described. Although embodiments have been described with reference to specific example embodiments, it will be evident that various modifications and changes can be made to these example embodiments without departing from the broader spirit and scope of the present application. Accordingly, the specification and drawings are to be regarded in an illustrative rather than a restrictive sense.

What is claimed is:

1. A method comprising:
   receiving, by a computing device, a user request via a communication chat between a user of the computing device and a further user of a further computing device;
   searching, by the computing device and based on the user request, a pool of personalized videos to determine a first subset of personalized videos;
   establishing, by the computing device, share rates of the personalized videos by a plurality of users, wherein the establishing of the share rates includes:
      determining, based on the user request, an activity category of one or more activity categories, the activity category being associated with the user request;
      selecting, from the pool of personalized videos, a portion of personalized videos having the activity category, the personalized videos being associated with the one or more activity categories;
      determining first share rates of the portion of personalized videos having the activity category; and
      determining second share rates of the personalized videos associated with the one or more activity categories;
   determining, by the computing device, first rankings of personalized videos in the first subset of personalized videos, wherein the first rankings are based on global statistical data associated with the personalized videos and the first share rates and the second share rates of the personalized videos;
   selecting, by the computing device and based on the first rankings, a second subset of personalized videos from the first subset of personalized videos;
   determining, by the computing device and based on at least one characteristic associated with the user, second rankings of personalized videos from the second subset of personalized videos; and
   presenting, by the computing device, the personalized videos selected from the second subset of personalized videos within the communication chat, wherein the personalized videos are ordered based on the second rankings.

2. The method of claim 1, wherein:
   the user request includes one or more emojis; and
   the searching includes:
      determining, based on the one or more emojis, a first vector representation for words associated with the one or more emojis;
      calculating similarity distances between the first vector representation for words and further vector representation for further words associated with the personalized videos in the pool;
      based on the similarity distances, selecting, from the pool, personalized videos corresponding to similarity distances not exceeding a predetermined threshold; and
      adding the selected personalized videos to the first subset of personalized videos.

3. The method of claim 2, wherein the first vector representation is determined by a pretrained model.

4. The method of claim 1, further comprising, prior to presenting the personalized videos:
   extracting content information from the communication chat between the user and the further user;
   based on the content information, determining that a video from the second subset of personalized videos relates to the content information; and
   based the determination, increasing a second ranking associated with the video.

5. The method of claim 1, wherein:
   the user request includes a phrase; and
   prior to the search, the user request is expanded by a synonym of the phrase.

6. The method of claim 1, wherein:
   the at least one characteristic associated with the user includes a favorite category of the user selected from the one or more activity categories.

7. The method of claim 1, wherein the at least one characteristic associated with the user includes one of the following: an age of the user and a gender of the user.

8. The method of claim 1, further comprising, after the selecting the second subset of personalized videos, adding, to the second subset of personalized videos, a video from the pool, the video having not been previously presented to the user.

9. The method of claim 1, wherein:
   the user request includes one or more words; and
   the search includes:
      determining a context associated with the one or more words;
      determining that at least one personalized video of the pool is associated with the context; and
      adding the at least one personalized video to the first subset of personalized videos.

10. The method of claim 1, wherein:
    the user request includes a phrase; and
    the search includes:
       calculating a similarity distance between the phrase and a text message associated with a video from the pool;
       determining that the similarity distance does not exceed a pre-determined threshold; and
       based on the determination, adding the video to the first subset of personalized videos.

11. A computing device comprising:
    a processor; and
    a memory storing instructions that, when executed by the processor, configure the computing device to:
       receive a user request via a communication chat between a user of the computing device and a further user of a further computing device;
       search, based on the user request, a pool of personalized videos to determine a first subset of personalized videos;
       establish share rates of the personalized videos by a plurality of users, wherein the establishing of the share rates includes:

determining, based on the user request, an activity category of one or more activity categories, the activity category being associated with the user request;

selecting, from the pool of personalized videos, a portion of personalized videos having the activity category, the personalized videos being associated with the one or more activity categories;

determining first share rates of the portion of personalized videos having the activity category; and determining second share rates of the personalized videos associated with the one or more activity categories;

determine first rankings of personalized videos in the first subset of personalized videos, wherein the first rankings are based on global statistical data associated with the personalized videos and the first share rates and the second share rates of the personalized videos;

select, based on the first rankings, a second subset of personalized videos from the first subset of personalized videos;

determine, based on at least one characteristic associated with the user, second rankings of personalized videos from the second subset of personalized videos; and present the personalized videos selected from the second subset of personalized videos within the communication chat, wherein the personalized videos are ordered based on the second rankings.

12. The computing device of claim 11, wherein:
the user request includes one or more emojis; and
the search includes:
  determining, based on the one or more emojis, a first vector representation for words, the words being associated with the one or more emojis;
  calculating similarity distances between the first vector representation for words and further vector representations of further words associated with the personalized videos in the pool;
  based on the similarity distances, selecting, from the pool, personalized videos corresponding to similarity distances not exceeding a predetermined threshold; and
  adding the selected personalized videos to the first subset of personalized videos.

13. The computing device of claim 12, wherein the first vector representation is determined by a pretrained model.

14. The computing device of claim 11, wherein the instructions further configure, prior to presenting the personalized videos, the computing device to:
extract content information from the communication chat between the user and the further user;
based on the content information, determine that a video from the second subset of personalized videos relates to the content information; and
based on the determination, increase a second ranking associated with the video.

15. The computing device of claim 11, wherein:
the user request includes a phrase; and
prior to the search, the user request is expanded by a synonym of the phrase.

16. The computing device of claim 11, wherein:
the at least one characteristic associated with the user includes a favorite category of the user from the one or more activity categories.

17. The computing device of claim 11, wherein the at least one characteristic associated with the user includes one of the following: an age of the user and a gender of the user.

18. The computing device of claim 11, wherein the instructions further configure the computing device to, after the selecting the second subset of personalized videos, add, to the second subset of personalized videos, a video from the pool, the video having not been previously presented to the user.

19. The computing device of claim 11, wherein:
the user request includes one or more words; and
the search includes:
  determining a context associated with the one or more words;
  determining that at least one personalized video of the pool is associated with the context; and
  adding the at least one personalized video to the first subset of personalized videos.

20. A non-transitory computer-readable storage medium, the computer-readable storage medium including instructions that when executed by a computing device, cause the computing device to:
receive a user request via a communication chat between a user of the computing device and a further user of a further computing device;

search, based on the user request, a pool of personalized videos to determine a first subset of personalized videos;

establish share rates of the personalized videos by a plurality of users, wherein the establishing of the share rates includes:
  determining, based on the user request, an activity category of one or more activity categories, the activity category being associated with the user request;
  selecting, from the pool of personalized videos, a portion of personalized videos having the activity category, the personalized videos being associated with the one or more activity categories;
  determining first share rates of the portion of personalized videos having the activity category; and
  determining second share rates of the personalized videos associated with the one or more activity categories;

determine first rankings of personalized videos in the first subset of personalized videos, wherein the first rankings are based on global statistical data associated with the personalized videos and the first share rates and the second share rates of the personalized videos;

select, based on the first rankings, a second subset of personalized videos from the first subset of personalized videos;

determine, based on at least one characteristic associated with the user, second rankings of personalized videos selected from the second subset of personalized videos; and present the personalized videos from the second subset of personalized videos within the communication chat, wherein the personalized videos are ordered based on the second rankings.

* * * * *